United States Patent [19]

Jenkins

[11] 3,831,691

[45] Aug. 27, 1974

[54] WALKING TREAD FOR AIR CUSHION VEHICLES

[75] Inventor: Dave H. Jenkins, Marietta, Ga.

[73] Assignee: Lockheed Aircraft Corporation, Burbank, Los Angeles, Calif.

[22] Filed: Oct. 17, 1973

[21] Appl. No.: 407,317

[52] U.S. Cl. .............................. 180/8 C, 180/119
[51] Int. Cl. .............................................. B60v 3/08
[58] Field of Search .................. 180/7 R, 8 R, 8 C; 180/119, 124, 127

[56] References Cited
UNITED STATES PATENTS

| 3,524,517 | 8/1970 | LaFleur | 180/124 |
| 3,537,540 | 11/1970 | Zuppiger | 180/8 C |

Primary Examiner—David Schonberg
Assistant Examiner—Terrance L. Siemens
Attorney, Agent, or Firm—Billy G. Corber; John J. Sullivan

[57] ABSTRACT

This walking tread provides a means for moving a vehicle, e.g., an aircraft, equipped with an air cushion landing system without starting the aircraft's primary engines. The device can move the aircraft from parked position forward, backward, or turn it by the proper sequencing of the walking tread.

This device, which is attached to the bottom surface of longitudinal portions of the aircraft is basically a mat with crosswise rows of inflatable treads that alternately inflate and deflate to produce a walking motion. The treads are of three basic types - forward walking, stationary and aft walking. The internal surfaces of the walking treads are cut on an incline to impart a forward or backward motion by sliding down the inclined tread planes as the air pressure attempts to lift the aircraft.

This system is operated by compressed air from the aircraft's auxiliary power unit, therefore, the starting of the aircraft's primary engines is not required.

10 Claims, 8 Drawing Figures

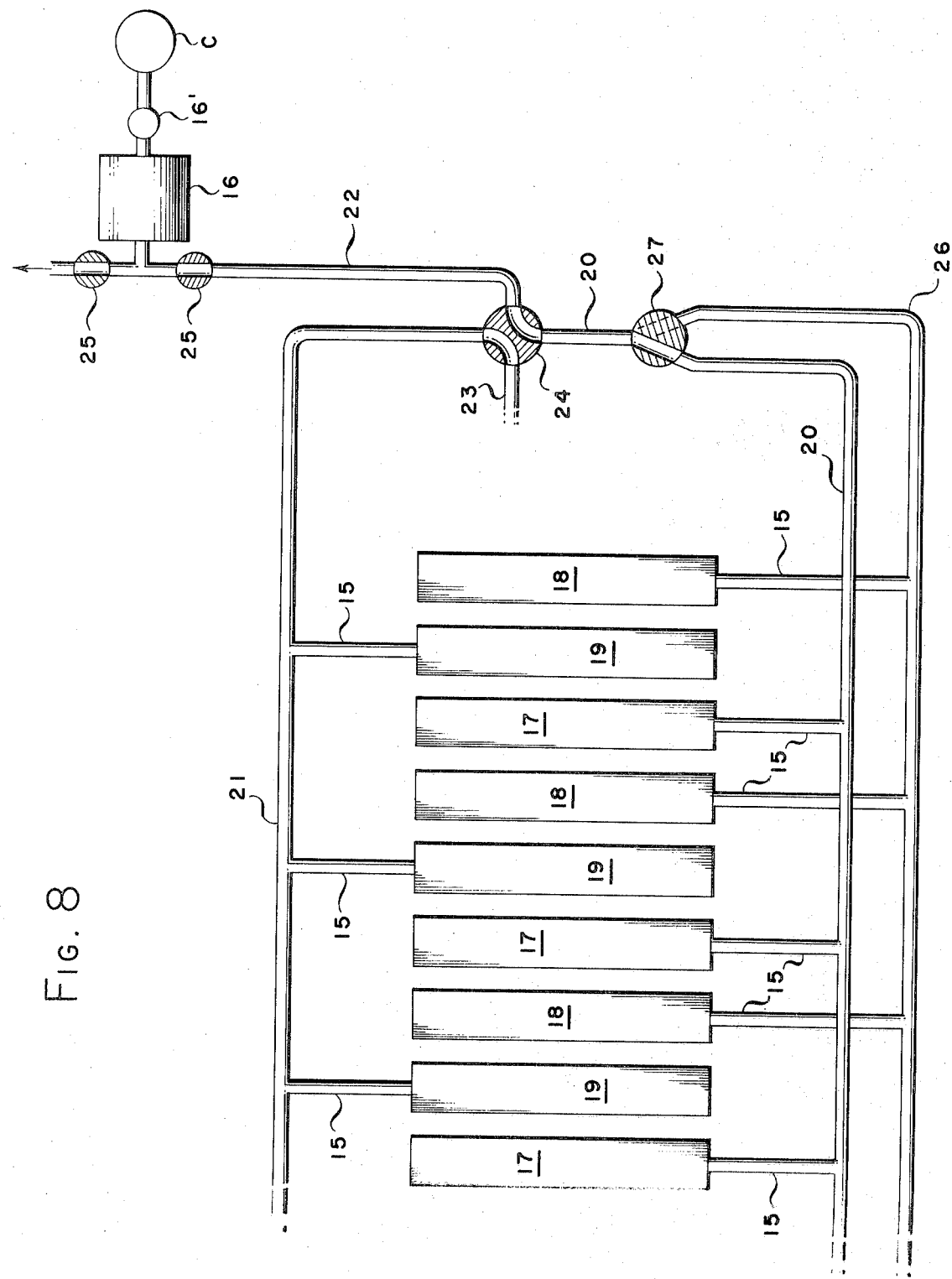

3,831,691

WALKING TREAD FOR AIR CUSHION VEHICLES

This invention relates to locomotive apparatus for transporting loads and more particularly to such an apparatus which is especially designed and adapted for use on air cushion vehicles to facilitate the movement thereof in a step-by-step or walking manner over a supporting surface during power-off conditions, i.e., when the air cushion is not operating.

Air cushion vehicles rely on a cushion of air between their undersurface and the adjacent supporting surface, the source of which air usually constitutes the primary power for movement of the vehicle. During power-off conditions these vehicles settle onto the supporting surface unless special provisions are made to retain them. My earlier U.S. Pat. No. 3,727,716 issued Apr. 17, 1973, offers means to sustain or park the vehicle in the power-off condition by trapping pressurized air in the air cushion trunk. At the same time, with this patented arrangement, towing of the vehicle is greatly facilitated.

The present invention contemplates improvements in the towing or otherwise moving of the vehicle about during power-off. While the improvements herein proposed may be readily combined with the air cushion trunk of my earlier patent referred to, it is not limited to that but is capable of general use on air cushion vehicles which employ skirts as well as trunks to confine the air cushion.

According to the instant invention a series of inflatable treads is attached to the undersurface of the vehicle on both the left and right sides. Ducting to each of these treads from a source of pressurized air onboard the vehicle is employed to selectively inflate and/or deflate each tread when these ducts are opened and closed by valves under the control of the operator. Thus selected treads on each side of the vehicle are inflated while the other treads on that side are deflated. Stepping, i.e., forward or backward movement, of the vehicle is effected by the action of the discrete treads having inclined internal planes when inflated in a coordinated sequence with the selected load lifting treads.

Prior art devices have been proposed to move a load over a surface. For example, the patent to Zippiger et al., U.S. Pat. No. 3,537,540 provides translation of a loaded platform by raising the load by air pressure while at the same time causing the load to translate by change in shape of the air cavity. Also, the Lewis et al., U.S. Pat. No. 3,693,740 produces translation of a loaded platform by inflating air cells in sequence which raises the load and simultaneously slides the load on the inflated cells.

These concepts, however, are different from that underlying the present invention in that these patented systems cause the load to move similarly to a worm over the ground by the sliding of alternate air tubes as the adjacent air tubes expand and contract. The system herein proposed, on the other hand, provides translation by shifting the weight or mass of the load from tread to tread. The lifting treads only lift while the translation treads provide forward or rearward movement by producing sliding on the inclined plane within the tread design as the air pressure attempts to lift the load.

With the above and other objects in view as will be apparent, this invention consists in the construction, combination, and arrangement of parts all as hereinafter more clearly described, claimed and illustrated by way of example as applied to an aircraft in the accompanying drawings wherein:

Figure 1:
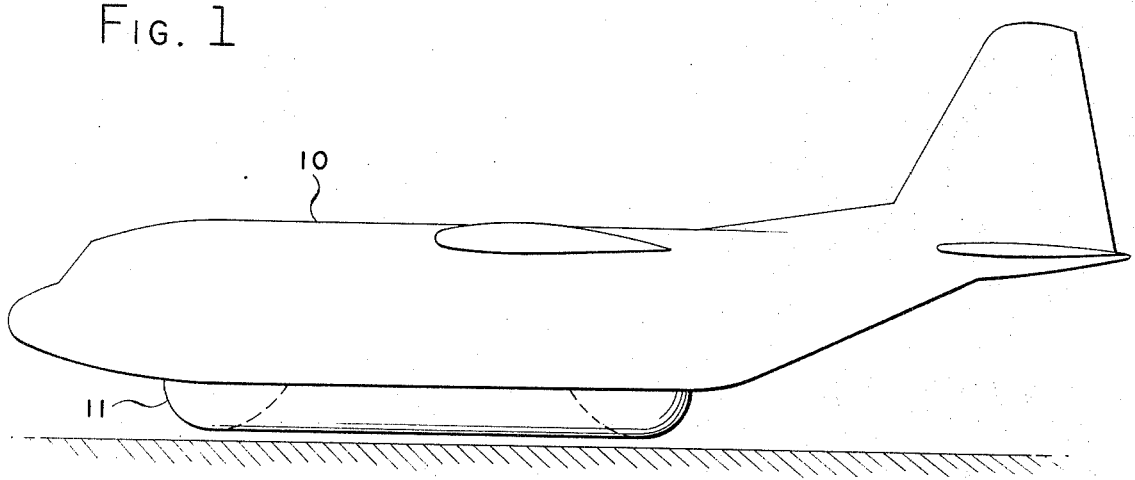
FIG. 1 is a side profile of a typical aircraft having an air cushion trunk on the underside or belly thereof to constitute the undercarriage for the aircraft, the trunk being illustrated in the fully inflated condition whereby the aircraft is supported above the air supporting surface.
Figure 2:
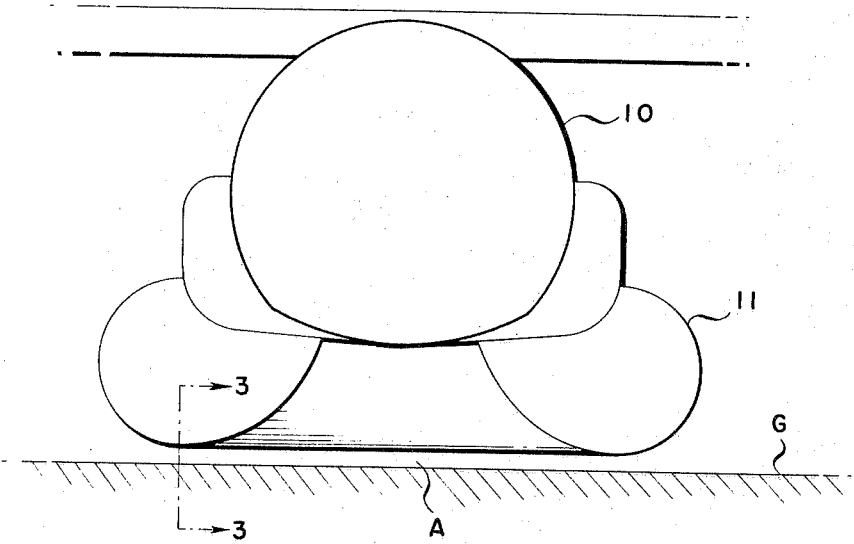
FIG. 2 is a transverse section taken through the aircraft illustrated in FIG. 1 to show in profile the fuselage and the air cushion trunk on both sides thereof.
Figure 3:
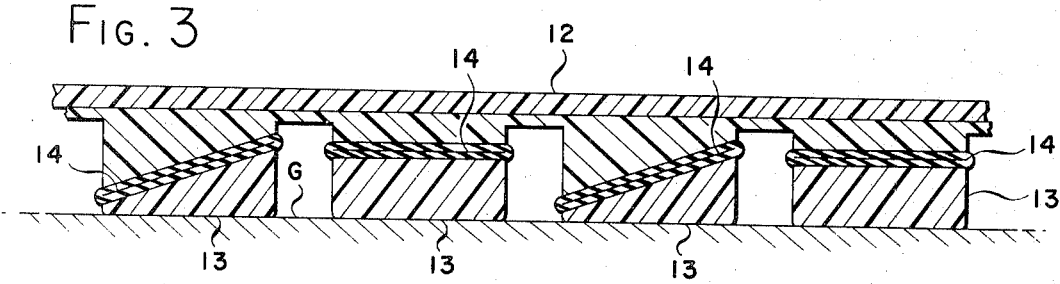
Figure 4:
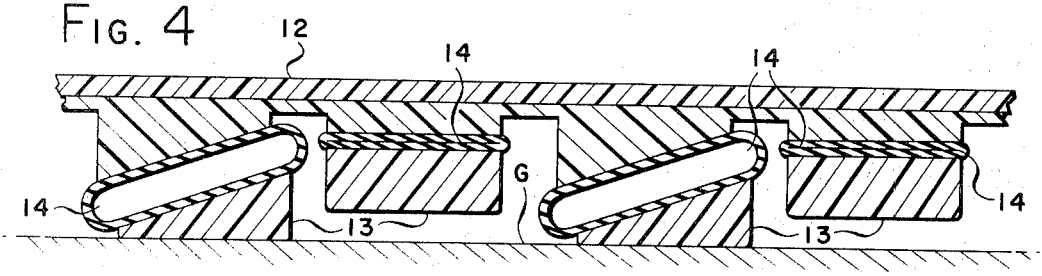
Figure 5:
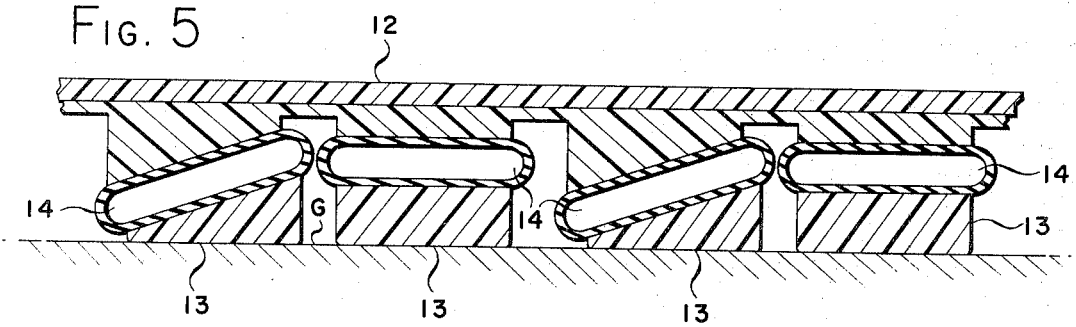
Figure 6:
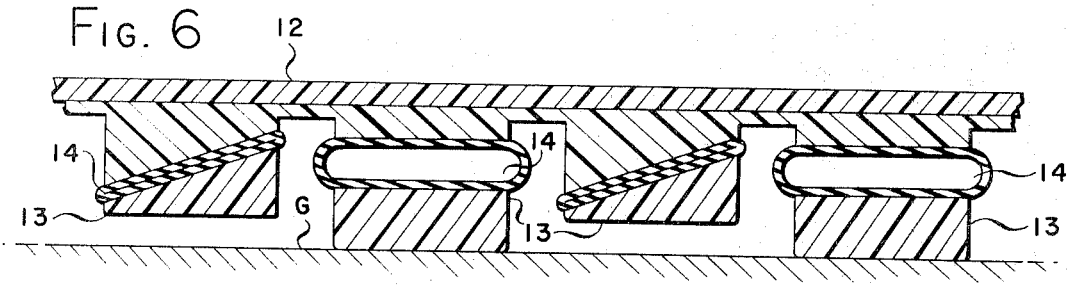
Figure 7:
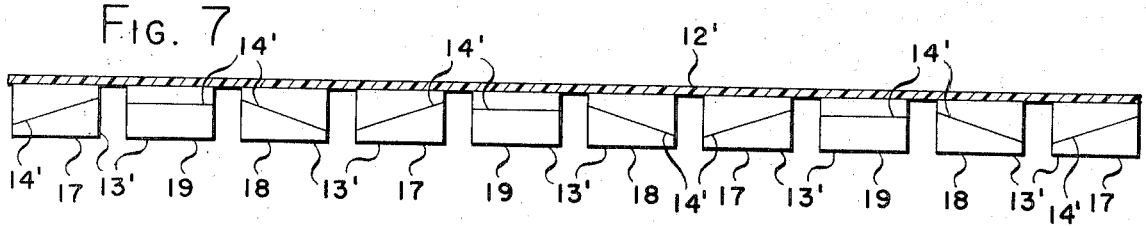

FIG. 3 is a section along line 3—3 of FIG. 2 to show a tread designed and constructed in accordance with the teachings of this invention as it would be applied to the air cushion trunk, the tread comprising discrete, spaced segments formed with internal cavities defined by walls that are alternately parallel and angular relative to the supporting surface, all said cavities being collapsed corresponding to the power off, parked condition of the aircraft;

FIG. 4 is a view similar to FIG. 3 showing the alternate tread segments with the angularly walled cavities fully inflated corresponding to the walking cycle of the tread;

FIG. 5 is a similar view with all of the tread segments, both those with the angularly and parallelly walled cavities, fully inflated corresponding to the load relieving cycle of the tread;

FIG. 6 is a similar view showing the alternate tread segments with the parallelly walled cavities fully inflated corresponding to the walking tread retraction cycle;

FIG. 7 is a view similar to FIG. 3 of a larger fragment of each tread to show the general configuration of each tread segment whereby forward and aft walking is accomplished; and FIG. 8 is a general schematic showing the ducting system for the treads on each side of the aircraft and includes the individual valving whereby pressurized air is directed to and exhausted from selected tread segments in order to accomplish the walking cycles, both forward and rearward.

Referring more particularly to the drawings, 10 designates a major component of an aircraft, such as for example the fuselage, on the underside of which an air cushion trunk 11 is mounted in any conventional manner. The configuration of this trunk 11 is generally rectangular in plan view and is of the type clearly illustrated in my earlier U.S. Pat. No. 3,727,716. When the aircraft is in close proximity to a surface G, the trunk 11 defines a substantially enclosed area A for the air ejected from the aircraft to produce a supporting cushion.

Extending along the length of the trunk 11 on each side of the fuselage 10 is a tread 12 composed of a mat of interconnected, discrete segments 13 each fabricated of a resilient material, such as for example rubber or the like, and each containing an internal cavity 14 whereby it may be inflated. To this end, communicating with each cavity 14 of each tread segment 13 is a duct 15, as illustrated in FIG. 8, the other end of which is operatively connected to a pressurized air supply tank 16 located at some convenient place within the aircraft, probably in the fuselage 10.

The pneumatic power is supplied to the tank 16 from an air compressor C driven for example by an existing auxiliary power unit (not shown) or the equivalent onboard the aircraft. A conventional check valve 16' is operatively installed between the compressor C and the tank 16 to prevent a reverse flow of air.

FIGS. 3 through 6 show a tread 12 designed and adapted for walking in one direction only, e.g., forward walking. In this case, the walls of every other tread cavity 14 on each side of the aircraft are each inclined at an acute angle of about 30° relative to the surface G with the walls of the intervening tread cavity 14 substantially parallel to the surface G.

FIGS. 7 and 8 show a tread 12' designed and adapted for walking in multiple directions, e.g., forward and reverse walking. In this case the walls defining the cavity 14' within each successive tread segment 13' on each side of the aircraft are disposed in different directions with each pair of adjacent tread segments 13 being inclined at about 30° in opposite directions and separated from the next pair of tread segments 13' by a segment 13' with its internal cavity walls substantially horizontal.

For reasons to become more apparent, the tread segments 13' with cavities 14' having inclined surfaces in one direction, for example 17, are referred to as forward walking treads, while those with inclined surfaces in the opposite direction, for example 18, are referred to as aft walking treads. The tread segments 13' with cavities 14' having horizontal surfaces 19 constitute the stationary treads.

As stated, the treads 12 and 12' form mats. In larger aircraft several mats may be installed end-to-end to cover the footprint area of the left and right hand portions of the air cushion trunk 11. In any case, the treads 12 and 12' on the left-hand side and the right-hand side of the aircraft 10 are independently operated from a common air tank 16 and compressor C. The treads 12 and 12' on each side of the aircraft 10 has its own cycling valve to alternate the operation of the walking and the stationary treads and its own directional control valve to selectively connect either the forward or aft walking treads 17 or 18. By varying the rotating speed of the two cycling valves a walking speed differential can be produced between the treads on the left and right hand sides of the trunk 11, thus producing a turning motion. For fast turning, such as turning around, one side of the trunk 11 can be walked forward while the other side is walked in reverse.

More specifically, the duct 15 from each forward walking tread 17 on each side of the trunk 11 connects to a common duct 20. The duct 15 from each stationary tread 19 on each side of the trunk 11 connects to a common duct 21. The ducts 20 and 21 in turn connect to a common duct 22 connected to the tank 16 and to an exhaust duct 23 through a rotary valve 24 whereby each duct 20 and 21 is operatively connected so as to receive air under pressure from the tank 16 when the other duct 20 or 21 is operatively connected to exhaust air from its treads 17 or 19 through duct 23. A conventional on and off valve 25 is operatively installed in the length of duct 22 between the rotary or cycling valve 24 and the tank 16.

To operate the system as above described the compressor C is started and air pressure is allowed to enter the supply tank 16 where it builds to operating pressure. Valves 25 for both right and left hand sides of the system are set initially and the rotational speeds thereof is adjusted to the desired walking speed. The system is then started by opening the shut-off valves 25 from the air tank 16. If forward walking was selected compressed air from the supply tank 16 is cycled to the several forward walking treads 17 on both sides of the aircraft causing them to inflate and lift the aircraft. This is depicted in FIG. 4 and referred to as the walking cycle.

When the aircraft is lifted, the air pressure acting on the inclined surface of all the treads 17 produces a horizontal as well as a vertical force component. The vertical force component lifts the aircraft while the horizontal force component moves the aircraft in a forward direction.

As the valve 24 rotates, air is then directed through the duct 21 to the several stationary treads 19 which inflate to relieve the load on the walking treads 17 permitting them to return to their deflated condition as the air therein is directed through duct 20 and exhaust duct 23. As the valve 24 continues to rotate the stationary treads 19 are connected to exhaust duct 23 causing their deflation while walking treads 17 are concurrently connected to the tank 16 causing their inflation. This cycle repeats so long as the valves 25 remain open.

In order to provide for reverse walking, each of the ducts 15 from the aft walking treads 18 is connected to a common duct 26, the other end of which is connected to the duct 20 through a selector valve 27 on the near side of the rotary valve 24. Thus, for reverse walking, the selector valve 27 is moved to connect the several aft walking treads 18 to the duct 20 through rotary valve 24 and duct 22 to the tank 16, whereby pressurized air from the tank 16 is delivered internally to the several aft walking treads 18. Now, as the rotary valve 24 rotates air is cycled to the stationary treads 19 which inflate to relieve the load of the aft walking treads 18 permitting them to return to their deflated conditions. The stationary treads 19 are then deflated and the cycle starts again so that this cycling walks the aircraft 10 aftwards in the same manner as forward walking, above described.

The principle of this invention has been hereinabove explained in order that it can be readily practiced by those skilled in the art. It has been illustrated in what is presently considered to be the best embodiment of the invention. Other embodiments may be preferred in given applications and are intended to be included in the scope of the appended claims to the extent that they suggest themselves to those skilled in the art having the benefit of this disclosure.

What is claimed is:

1. A walking tread for an air cushion vehicle comprising:
   a series of inflatable segments attached to the underside of said vehicle on both sides thereof, each adjacent segment of each said series having an internal cavity defined by walls disposed in predetermined, different planes relative to a supporting surface, some of said planes being inclined and some of said planes being parallel relative to said supporting surface;
   a source of pressurized air carried by said vehicle;
   ducting between said source of pressurized air and each said cavity; and
   valving in said ducting operative to selectively connect said source of pressurized air to all of said cavities on both sides of said vehicle having walls disposed in the same plane whereby alternatively inflating and deflating the cavities having the same plane walls produces a stepping motion moving the vehicle accordingly.

2. The walking tread of claim 1 wherein each of said inclined planes is at an angle of approximately 30° relative to said supporting surface.

3. The walking tread of claim 1 wherein said valving includes a rotary valve in the length of said ducting operative to alternately connect all of the cavities having walls disposed in the same inclined plane to said source of pressurized air while concurrently connecting all the cavities disposed in the parallel plane to exhaust.

4. The walking tread of claim 1 wherein the cavities defined by inclined walls are each separated by a cavity defined by parallel walls.

5. The walking tread of claim 1 wherein some of said inclined cavity walls are disposed in one direction relative to said supporting surface and the other of said inclined cavity walls are disposed in the opposite direction relative to said supporting surface.

6. The walking tread of claim 5 wherein all of said inclined cavity walls are disposed at an angle of approximately 30° relative to said supporting surface.

7. The walking tread of claim 5 wherein the inclined cavity walls disposed in different directions aforesaid are adjacent one another and one of said parallel cavity walls is located between each pair of said adjacent differently inclined cavity walls.

8. The walking tread of claim 5 wherein said valving includes a rotary valve in the length of said ducting operative to connect all of said inclined cavity walls in the same direction to said source of pressurized air while concurrently connecting all of said parallel cavity walls to exhaust and reversing such connections in sequence.

9. The walking tread of claim 8 wherein said valving further includes a selector valve in the length of said ducting between said rotary valve and said cavities defined by inclined walls, said selector valve being operative to operatively connect either one of the cavities defined by walls in the same direction and to concurrently disconnect the other of the cavities defined by walls in the same direction.

10. The walking tread of claim 1 wherein said ducting includes a duct common to said inflatable segments on both sides of said vehicle, a connecting duct between said common duct and said source of pressurized air, and said valving includes a shut off valve in said common duct between said connecting duct and said inflatable segments on each side of said vehicle.

* * * * *